United States Patent Office 3,043,863
Patented July 10, 1962

3,043,863
POLYENE ALCOHOLS AND ACYL DERIVATIVES THEREOF
Otto Isler, Basel, Rudolf Rüegg, Bottmingen, and Ulrich Schwieter, Basel, Switzerland, assignors to Hoffmann-La Roche Inc., Nutley, N.J., a corporation of New Jersey
No Drawing. Filed Aug. 24, 1959, Ser. No. 835,428
Claims priority, application Switzerland Aug. 28, 1958
8 Claims. (Cl. 260—488)

This invention relates to the production of polyunsaturated alcohols and acyl derivatives thereof. More particularly, the invention relates to alcohols and their fatty acid derivatives of the class broadly described as carotenoids.

According to one aspect of this invention, an unsaturated aldehyde having the formula

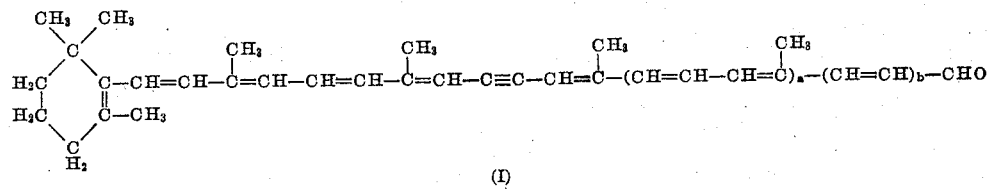

(I)

wherein $a$ represents an integer from 0 to 3 and $b$ represents an integer from 0 to 1, is reacted with an alkali metal metal hydride to obtain an alcohol having the formula

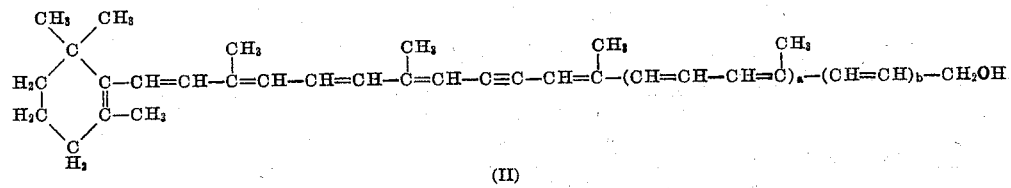

(II)

wherein $a$ and $b$ have the same meaning as in Formula I.

According to another modification, an aldehyde with a conjugated system of carbon to carbon multiple bonds containing all double bonds and having the formula

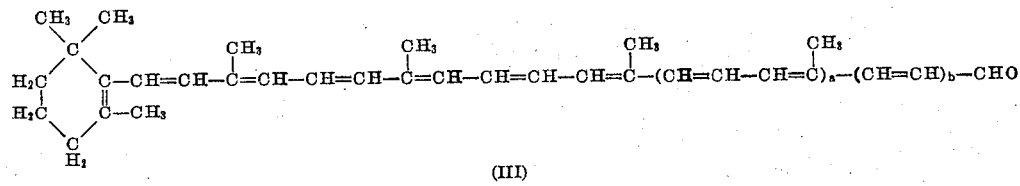

(III)

wherein $a$ and $b$ have the same meaning as in Formula I is reacted with an alkali metal metal hydride to obtain an alcohol having the formula

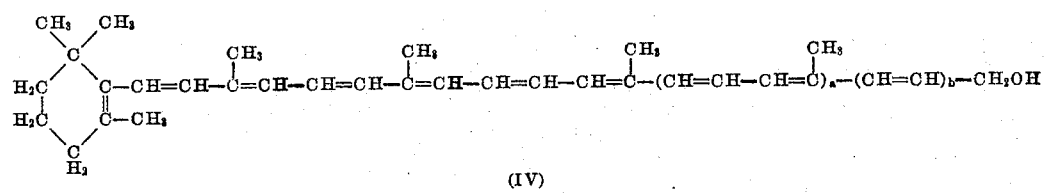

(IV)

wherein $a$ and $b$ have the same meaning as in Formula I

Acyl derivatives, e.g. alkanoic acid derivatives, of the alcohols of Formulas II and IV may be obtained by reacting the alcohol with an anhydride or a halide of an alkanoic acid in the presence of an organic base. Acyl derivatives having the following formulas are thereby obtained, respectively:

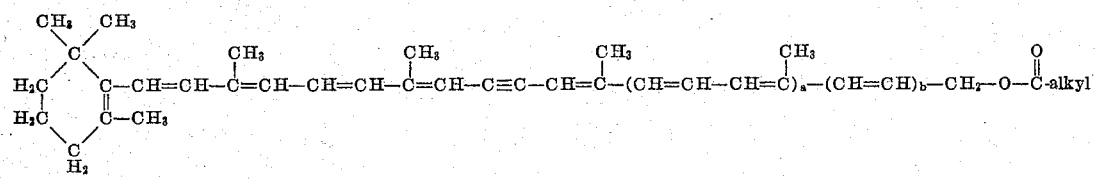

(V)

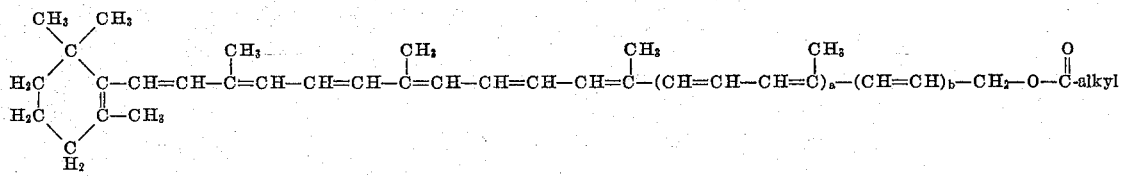

(VI)

*a* and *b* in each of the above formulas have the same meaning as in Formula I. The alkyl groups in Formulas V and VI are the alkyl radicals which together with the carbonyl group form the acyl residue of the alkanoic acids referred to above.

Alkali metal metal hydrides used in the reaction with the aldehydes of Formulas I and III include, for example, lithium aluminum hydride, sodium borohydride, or potassium borohydride. Preferably the metal hydride is used in an inert solvent, for example lithium aluminum hydride in absolute ether, tetrahydrofuran, etc., or sodium- or potassium borohydride in an aqueous alcohol, such as methanol or ethanol, or in dioxane or the like. At the conclusion of the reaction the metal hydride used for reducing the aldehyde group may be destroyed by the addition of water and ethyl acetate, ether or the like, and the product isolated by conventional procedures such as evaporation of the solvents, extraction, etc. The alcohols thus obtained are yellow to red crystalline compounds with characteristic maxima in the ultraviolet absorption spectrum.

The alcohols of Formulas II and IV may be converted to their acyl derivatives V and VI by reacting the alcohol with the anhydride or halide of an organic acid, such as an alkanoic acid, preferably the anhydride or chloride of alkanoic acids, such as acetic acid, propionic acid, butyric acid, palmitic acid etc. The acylation reaction is preferably effected in an inert solvent such as absolute ether, methylene chloride, benzene, toluene, chloroform, etc., and in the presence of an organic base such as pyridine, quinoline, dimethylaniline, methylamine, etc.

The products described above are crystalline compounds varying in hue from yellow to red. They are useful as coloring agents for foods and feeds, for example as poultry feed additives, to effect coloring of the egg yolks or pigmentation of the shank, beak, skin, fat and meat of the fowl.

Various starting materials as well as products involved in the present invention are novel. A method for synthesizing the starting materials is therefore described below.

The aldehyde of Formula I wherein *a* and *b* both represent 0 is the starting material for the production of other aldehydes of Formula I and the aldehydes of Formula III, as well as the alcohols and their acyl derivatives of Formulas II, IV, V and VI ultimately derived from those aldehydes.

The aldehyde referred to, 13-(2,6,6-trimethyl-1-cyclohexen - 1 - yl)-2,7,11-trimethyl-2,6,8,10,12-tridecapentaen-4-yn-1-al, according to the systematic nomenclature, may be produced as described in detail in Example 1 below. The other aldehydes of Formula I are obtained from the aldehyde named above by repeating a sequence of reaction steps which result in lengthening the carbon chain and lead serially from one aldehyde to another. This sequence of reaction steps comprises the three operations of acetalizing the aldehyde group by means of a lower alkyl acetalizing agent, condensing the acetal derived with either a vinyl alkyl ether or a propenyl alkyl ether, and then treating the condensation product with acid.

The acetalization may be effected by reaction of the aldehyde with an orthoformic acid alkyl ester such as orthoformic acid ethyl ester in the presence of an acid catalyst such as phosphoric acid or p-toluenesulfonic acid. The acetals are condensed with about an equimolecular proportion of a vinyl ether such as vinyl ethyl ether or a propenyl ether such as propenyl ethyl ether in an inert solvent such as benzene, ether or petroleum ether. An acid catalyst, e.g. zinc chloride or boron trifluoride etherate, may be introduced. Upon treatment of the condensation product with an acid, such as acetic acid, p-toluenesulfonic acid or hydrohalic acid, in the presence of an alkali or ammonium salt of the corresponding acid hydrolysis occurs and alcohol is simultaneously split off so that the desired acetylenic aldehyde is formed. The sequence of steps described above may be repeated as many times as desired in order to obtain any of the series of acetylenic aldehydes of Formula I. By using a vinyl ether in going from the first aldehyde to the second aldehyde in the series and a propenyl ether from the second aldehyde to the third aldehyde, then continuing to alternate vinyl- and propenyl ethers in proceeding to the succeeding aldehydes in the series, the conjugated system of carbon to carbon multiple bonds as well as the side chain methyl groups characteristic of carotenoids are attained.

The aldehydes of Formula III are obtained from the aldehydes of Formula I by selectively hydrogenating the triple bond to a double bond. The hydrogenation may be effected in the presence of excess hydrogen under normal pressure in an inert solvent such as petroleum ether and in the presence of a selective hydrogenation catalyst, for example a lead and quinoline deactivated palladium-calcium carbonate catalyst [Helvetica Chimica Acta, 35, 446 (1952)].

The following examples are illustrative of the invention. All temperatures are stated in degrees centigrade.

*Example 1*

In a stirring flask 620 ml. of ethyl orthoformate were mixed with 1.6 ml. of boron trifluoride etherate and the mixture was heated to 30°. Into this warm mixture was dropped a mixture of 520 ml. propenyl ethyl ether and 620 ml. of ethyl orthoformate. The exothermic reaction was maintained at a temperature between 30 and 40° adjusting the rate of dropping and, if necessary, by external cooling. After completion of the reaction the solution was washed with aqueous sodium bicarbonate solution, dried with sodium sulfate and subjected to fractional distillation. The excess ethyl orthoformate initially added was obtained as a forerun. The resulting 1,1,3,3-tetraethoxy - 2 - methylpropane boiled at 93–95°/10 mm.; $n_D^{20°}=1.4132$. 468 g. of 1,1,3,3-tetraethoxy-2-methylpropane were heated for 6 hours at 40° together with 528 ml. of water and 53 ml. of 3 N sulfuric acid. A small amount of phenolphthalein was added to the cooled mixture, and then 4 N aqueous caustic soda solution was added until the red color persisted. The reaction mixture was concentrated to dryness in vacuo at 55°, and the residue was recrystallized from ethanol. There was thus obtained the sodium salt of 3-hydroxy-2-methyl-2-propen-1-al. 54 g. of this sodium salt were suspended in 250 ml. of methylene chloride, and to the suspension were then added while stirring 60 ml. of benzoyl chloride. After refluxing for two hours, the precipitated sodium chloride was separated and the filtrate was concentrated to 120 ml. To the concentrate were added, while agitating, 1200 ml. of low-boiling petroleum ether, and the precipitation was completed by cooling. After filtering and drying there was obtained 3-benzoyloxy-2-methyl-2-propen-1-al of M.P. 79–80°.

Dry, acetone-free acetylene was introduced into a solution of 1.9 g. of lithium in 900 ml. of liquid ammonia until complete conversion occurred. A solution of 61.2 g. of 8 - (2,6,6 - trimethyl - 1 - cyclohexen - 1 - yl) - 2,6 - dimethyl-2,4,6-octatrien-1-al in 200 ml. of dry ether was added with vigorous stirring over a 20 minute period. The reaction mixture was stirred vigorously for 20 hours with the exclusion of moisture. 35 g. of ammonium chloride were then added in small portions and the ammonia was permitted to evaporate. 260 ml. of water were added and the mixture was permitted to stratify. The ether layer was separated, washed with water, dried with sodium sulfate and concentrated in vacuo. The remaining reddish oil was strongly dried in vacuo. The 10-(2,6,6-trimethyl-1-cyclohexen-1-yl)-4,8-dimethyl-4,8-decatrien-1-yn-3 - ol (U.V. absorption maxima at 280.5 and 291 m$\mu$ in petroleum ether) thus obtained was dissolved in 200 ml. of absolute ether and added gradually with stirring at 15 to 20° to an ethyl magnesium bromide solution (prepared from 12.3 g. magnesium and 67 g. ethyl bromide in 200 ml. absolute ether). The mixture was then heated in a nitrogen atmosphere for one hour under reflux, cooled with ice water and diluted with 200 ml. of dry methylene chloride. A solution of 42 g. 3-benzoyloxy-2-methyl-2-propen-1-al in 200 ml. of methylene chloride was quickly poured in. The mixture was stirred for an additional two hours while cooling with ice. The reaction mixture was then poured into ice cold dilute acetic acid and permitted to stratify. The organic layer was separated, washed with water, dried with sodium sulfate and the solvent was evaporated in vauco at 30°. Crude 13-(2,6,6-trimethyl-1-cyclohexen-1-yl)-2,7,11-trimethyl-1 - benzoyloxy - 1,7,911-tridecatetraen-4-yn-3,6-diol was obtained as a yellow viscous oil which was used directly in the next step without further purification.

The oil was dissolved in 700 ml. of isopropanol, treated with 5 ml. of glacial acetic acid and boiled for three hours in a nitrogen atmosphere. After diluting with water, the reaction product was extracted with ether, washed with dilute sodium bicarbonate solution and dried with sodium sulfate. The ether was then evaporated in vacuo. The crude 13-(2,6,6-trimethyl - 1 - cyclohexen-1-yl)-2,7,11-trimethyl-2,6,8,10,12-tridecapentaen-4-yn-1-al thus obtained was crystallized from petroleum ether (boiling range 80–100°) forming yellow leaflets, M.P. 82–83°; U.V. absorption maximum at 402–404 m$\mu$ ($E_1^1$=1790) in petroleum ether solution.

20 g. of 13-(2,6,6-trimethyl-1-cyclohexen-1-yl)-2,7,11-trimethyl-2,6,8,10,12-tridecapentaen-4-yn-1-al were dissolved in 300 ml. of high boiling petroleum ether and 3 g. of a lead deactivated palladium-calcium carbonate catalyst together with 0.2 ml. of quinoline were added. The mixture was agitated in a hydrogen atmosphere until the absorption of hydrogen came to a halt. The catalyst was then separated by filtration. The filtrate was heated to boiling for 6 hours in a nitrogen atmosphere. The solvent was evaporated and the product, 13-(2,6,6-trimethyl-1-cyclohexen-1-yl)-2,7,11-trimethyl - 2,4,6,8,10,12 - tridecahexaen-1-al was crystallized from low boiling petroleum ether, M.P. 88–89°.

3.5 g. (0.01 mol) of 13-(2,6,6-trimethyl-1-cyclohexen-1-yl)-2,7,11 - trimethyl - 2,4,6,8,10,12 - tridecahexaen-1-al were dissolved in absolute ether and absolute benzene was added to make a total volume of about 100 ml. The solution was cooled to 0°. A solution of 35 mg. of lithium aluminum hydride in 10 ml. of absolute ether was dropped in with stirring under a nitrogen atmosphere. The reaction mixture was permitted to stand for one hour. 1 ml. of ethyl acetate, then 100 ml. of 0.5 N sulfuric acid were added and the mixture was extracted with ether. The ether extract was washed with 5% sodium bicarbonate solution and with water, dried with sodium sulfate and evaporated under vacuum. The 13-(2,6,6-trimethyl-1-cyclohexen-1-yl)-2,7,11 - trimethyl - 2,4,6,8,10,12-tridecahexaen-1-ol showed absorption maxim in the U.V. spectrum at 377 and 393 m$\mu$.

The product obtained above was dissolved in 20 ml. of absolute ether and 10 ml. of pyridine were added. The solution was cooled to 0° and a solution of 5 ml. of acetyl chloride in 30 ml. of absolute ether was dropped in with stirring in a nitrogen atmosphere. The mixture was permitted to stand at room temperature for 2 hours then extracted with ether. The ether extract was washed successively with 1 N sulfuric acid, 5% sodium bicarbonate solution and water, dried over sodium sulfate, filtered and concentrated under vacuum. The product, 13-(2,6,6-trimethyl-1-cyclohexen-1-yl)-2,7,11 - trimethyl - 1 - acetoxy-2,4,6,8,10,12-tridecahexaene, crystallized from petroleum ether in the form of yelow-orange prisms, M.P. 87–89°, U.V. absorption maxima at 378 and 396 m$\mu$ in petroleum ether ($E_1^1$=2120, 2095).

*Example 2*

18 g. 13-(2,6,6-trimethyl-1-cyclohexen-1-yl)-2,7,11-trimethyl-2,6,8,10,12-tridecapentaen - 4 - yn - 1 - al were suspended in 17 ml. orthoformic acid ethyl ester, treated with a solution of 0.24 ml. phosphoric acid and a trace of p-toluenesulfonic acid in 8 ml. of absolute alcohol and stirred for several hours at room temperature. When everything was dissolved, the solution was permitted to stand for another 15 hours, 1.5 ml. of pyridine were added with ice cooling and then 50 ml. of 5% sodium bicarbonate solution. The mixture was then extracted with petroleum ether. The extract was washed with water, dried with sodium sulfate and evaporated in vacuo. The residue was dried under a high vacuum at 60°. 1,1-diethoxy-13-(2,6,6-trimethyl-1-cyclohexen - 1 - yl) - 2,7,11 - trimethyl-2,6,8,10,12-tridecapentaen-4-yne was thus obtained as a yellow oil. This compound was treated with 4 ml. of 10% zinc chloride solution in ethyl acetate and then dropwise with 4.27 g. of vinyl ethyl ether while stirring at 30–35°. The reaction mixture was permitted to stand for 15 hours. To the 1,1,3-triethoxy-15-(2,6,6-trimethyl-1-cyclohexen-1-yl) - 4,9,13 - trimethyl - 4,8,10,12,14 - pantadecapentaen-6-yne obtained as the product of the reaction was added a solution of 5 g. of sodium acetate in 50 ml. of 95% acetic acid. The mixture was heated with vigorous stirring in a nitrogen atmosphere for 4 hours at 95–100° whereupon the ethyl acetate formed distilled off slowly. The reaction mixture was permitted to cool with stirring. The reaction product, 15-(2,6,6-trimethyl-1-cyclohexen-1-yl)-4,9,13-trimethyl-2,4,8,10,12,14 - pentadecahexaen - 6-yn-1-al, crystallized, was filtered off, washed with water and recrystallized from petroleum ether, M.P. 122°.

The 15-(2,6,6-trimethyl-1-cyclohexen-1-yl) - 4,9,13-trimethyl-2,4,8,10,12,14-pentadecahexaen-6-yn-1-al was selectively reduced by the procedure described in the fourth paragraph of Example 1 to obtain 15-(2,6,6-trimethyl-1-cyclohexen-1-yl)-4,9,13-trimethyl - 2,4,6,8,10,12,14-pentadecaheptaen-1-al as red needles, M.P. 97–99°. This aldehyde was then reacted with lithium aluminum hydride by the same procedure as that described in the fifth paragraph of Example 1 to obtain 15-(2,6,6-trimethyl-1-cyclohexen-1-yl) - 4,9,13 - trimethyl - 2,4,6,8,10,12,14 - pentadecaheptaen-1-ol, U.V. absorption maxima at 403 and 424 m$\mu$.

The alcohol obtained above was reacted with acetyl chloride exactly according to the procedure described in the last paragraph of Example 1 to obtain 15-(2,6,6-trimethyl-1-cyclohexen-1-yl)-4,9,13 - trimethyl - 1 - acetoxy-2,4,6,8,10,12,14-pentadecaheptaene as an orange oil, U.V. absorption maxima at 405 and 425 m$\mu$ in petroleum ether ($E_1^1$=1835,1905).

*Example 3*

18 g. of 15-(2,6,6-trimethyl-1-cyclohexen-1-yl)-4,9,13-trimethyl-2,4,8,10,12,14-pentadecahexaen-6-yn-1-al were acetalized with orthoformic acid ethyl ester in the presence of phosphoric acid and p-toluenesulfonic acid in ethanol as described in the preceding example. Crude 1,1 - diethoxy - 15 - (2,6,6 - trimethyl - 1 - cyclohexen - 1-yl) - 4,9,13 - trimethyl - 2,4,8,10,12,14 - pentadecahexaen-6-yne was obtained as a crystalline mass which was used in the next step without purification. 22 g. of the crude acetal were dissolved in 16 ml. of benzene and treated with 3 ml. of 10% zinc chloride-ethyl acetate solution. 4.7 g. of propenyl ethyl ether were added dropwise while stirring at a temperature of 30–35° and let stand for 15 hours. To hydrolyze the product the crude 1,1,3-triethoxy - 17 - (2,6,6 - trimethyl - 1 - cyclohexen - 1 - yl)-2,6,11,15 - tetramethyl - 4,6,10,12,14,16 - heptadecahexaen-8-yne obtained was treated with a solution of 10 g. sodium acetate in 100 ml. of 95% acetic acid and heated with vigorous stirring in a nitrogen atmosphere for 4 hours at 95–100°. The benzene and the ethyl acetate formed distilled off slowly. The reaction mixture was permitted to cool and the crystalline reaction product was isolated and purified as in the preceding example. The 17 - (2,6,6, - trimethyl - 1 - cyclohexen - 1 - yl) - 2,6,11,15-tetramethyl - 2,4,6,10,12,14,16 - heptadecaheptaen - 8-yn-1-al was obtained as shiny red leaflets, M.P. 130.5°.

10 g. of 17-(2,6,6-trimethyl-1-cyclohexen-1-yl)-2,6,11, 15 - tetramethyl - 2,4,6,10,12,14,16 - heptadecaheptaen-8-yn-1-al were suspended in 700 ml. of petroleum ether and 2 g. of a lead deactivated palladium-calcium carbonate catalyst together with 0.1 ml. of quinoline were added. The mixture was shaken in a hydrogen atmosphere whereupon the material gradually went into solution. After 1.1 mols of hydrogen were absorbed, the catalyst was filtered off and the filtrate was concentrated under vacuum at 20°. The residue was suspended in 30 ml. of petroleum ether and heated to boiling for 15 hours in a carbon dioxide atmosphere. The solvent was distilled off under vacuum. The residue, 17-(2,6,6-trimethyl-1-cyclohexen-1-yl)-2,6, 11,15 - tetramethyl - 2,4,6,8,10,12,14,16 - heptadecaoctaen-1-al, was crystallized from ethanol, M.P. 136–137°.

1.2 g. of 17-(2,6,6-trimethyl-1-cyclohexen-1-yl)-2,6,11, 15 - tetramethyl - 2,4,6,8,10,12,14,16 - heptadecaoctaen-1-al were dissolved in 100 ml. of absolute ether and the solution was cooled to 0°. A solution of 35 mg. of lithium aluminum hydride in 10 ml. of absolute ether was added dropwise and the mixture was permitted to react for one hour. After the addition of 1 ml. of ethyl acetate, 50 ml. of 0.5 N sulfuric acid were added and the mixture was extracted with ether. The ether extract was washed with 5% sodium bicarbonate solution and with water, dried over sodium sulfate and after filtering under vacuum, concentrated at 20°. The 17-(2,6,6-trimethyl-1-cyclohexen - 1 - yl) - 2,6,11,15 - tetramethyl - 2,4,6,8,10, 12,14,16-heptadecaoctaen-1-ol was used in the next step without further purification. An aliquot, crystallized from petroleum ether-benzene, gave orange needles, M.P. 148–149°, U.V. absorption maxima at 426 and 453 m$\mu$ in ethanol ($E_1^1$=2690, 2440).

The alcohol obtained above was dissolved in 20 ml. of absolute ether, 3 ml. of pyridine were added, then a solution of 1 g. of acetyl chloride in 10 ml. of absolute ether was dropped in at 0° with stirring. After 2 hours, the reaction mixture was extracted with ether, the ether extract was washed successively with 1 N sulfuric acid, 5% sodium bicarbonate solution and water, then dried over sodium sulfate, filtered and the solvent evaporated under vacuum. The residue was crystallized from petroleum ether to obtain orange leaflets of 17-(2,6,6-trimethyl-1-cyclohexen - 1 - yl) - 2,6,11,15 - tetramethyl - 1 - acetoxy-2,4,6,8,10,12,14,16 - heptadecaoctaene, M.P. 130–132°, U.V. absorption maxima at 426 and 452 m$\mu$ in petroleum ether ($E_1^1$=2665 and 2400).

*Example 4*

174 g. of 17-(2,6,6-trimethyl-1-cyclohexen-1-yl)-2,6,11, 15 - tetramethyl - 2,4,6,10,12,14,16 - heptadecaheptaen-8-yn-1-al were suspended in 76.6 ml. of orthoformic acid ethyl ester, treated with a solution of 1.4 ml. of phosphoric acid and 0.1 g. of p-toluenesulfonic acid in 35 ml. of absolute ethanol and stirred for five hours at 35° under an atmosphere of nitrogen. 100 ml. of absolute benzene were added at 35° and the mixture was stirred for an additional 40 hours. While cooling with ice, 10 ml. of pyridine and then 200 ml. of 5% sodium bicarbonate solution were added and then extracted with ether. The ether extract was washed with water, dried with potassium carbonate and concentrated in vacuo. The residue was then dried at 40° under high vacuum. 1,1-diethoxy-17-(2,6,6-trimethyl - 1 - cyclohexen - 1 - yl) - 2,6,11,15 - tetramethyl-2,4,6,10,12,14,16-heptadecaheptaen-8-yne was obtained in the form of yellow plates. An aliquot of the crude product was recrystallized from ethanol, M.P. 85 to 86°.

The crude product obtained above was dissolved in 150 ml. of absolute benzene. While stirring at 30°, 34 g. of vinyl ethyl ether and 25 cc. of a 10% solution of zinc chloride in ethyl acetate were simultaneously dropped in. Stirring was continued at room temperature under a nitrogen atmosphere for 16 hours. To the 1,1,3-triethoxy-19-(2,6,6 - trimethyl - 1 - cyclohexen - 1 - yl) - 4,8,13,17-tetramethyl - 4,6,8,12,14,16,18 - nonadecaheptaen - 10-yne thus obtained was added a solution of 50 g. of sodium acetate in 500 ml. of 95% acetic acid and the mixture was heated for four hours at 95° in a nitrogen atmosphere while stirring. Upon cooling, the reaction mixture was taken up in methylene chloride, the methylene chloride extract was washed with a 5% sodium bicarbonate solution and with water, dried over sodium sulfate and concentrated in vacuo. The residue was recrystallized from high boiling petroleum ether. The 19-(2,6,6-trimethyl-1-cyclohexen - 1 - yl) - 4,8,13,17 - tetramethyl - 2,4,6,8,12, 14,16,18-nonadecaoctaen-10-yn-1-al was obtained as red leaflets; M.P. 146 to 147°.

10 g. of 19-(2,6,6-trimethyl-1-cyclohexen-1-yl)-4,8,13, 17 - tetramethyl - 2,4,6,8,12,14,16,18 - nonadecaoctaen-10-yn-1-al were dissolved in 200 ml. of absolute benzene and 3.9 ml. of a 6.4% solution of lithium aluminum hydride in absolute ether were added at room temperature with stirring. After one hour the product was worked up as described in Example 3. There was obtained an orange crystalline residue of 19-(2,6,6-trimethyl-1-cyclohexen-1-yl) - 4,8,13,17 - tetramethyl - 2,4,6,8,12,14,16,18 - nonadecaoctaen-10-yn-1-ol, U.V. absorption maxima at 424 and 451 m$\mu$ in petroleum ether ($E_1^1$=2150, 1805).

The product obtained was dissolved in 100 ml. of methylene chloride, treated with 10 ml. of pyridine and a solution of 5 ml. of acetyl chloride in 30 ml. of absolute ether was dropped in at room temperature with stirring. The reaction mixture was permitted to stand for 3 hours and then worked up as described in Example 3. The product, 19-(2,6,6-trimethyl-1-cyclohexen-1-yl)-4,8,13,17-tetramethyl-1-acetoxy-2,4,6,8,12,14,16,18-nonadecaoctaen-10-yne, was crystallized from ethyl acetate, M.P. 155–156°, U.V. absorption maxima at 424 and 451 m$\mu$ in petroleum ether ($E_1^1$=2090, 1765).

Example 5

The compound 19-(2,6,6-trimethyl-1-cyclohexen-1-yl)-4,8,13,17-tetramethyl-2,4,6,8,12,14,16,18-nonadecaotaen-10-yn-1-al was selectively hydrogenated exactly according to the procedure described in the fourth paragraph of Example 1 to obtain 19-(2,6,6-trimethyl-1-cyclohexen-1-yl) - 4,8,13,17 - tetramethyl - 2,4,6,8,10,12,14,16,18-nonadecanonaen-1-al.

1.0 g. of 19-(2,6,6-trimethyl-1-cyclohexen-1-yl)-4,8,13,17-tetramethyl-2,4,6,8,10,12,14,16,18-nonadecanonaen-1-al were dissolved in 100 ml. of absolute ether. After cooling the solution to 0°, a solution of 30 mg. of lithium aluminum hydride in 5 ml. of absolute ether was dropped in. The mixture was permitted to react for one hour, then worked up as described in Example 3. The 19-(2,6,6 - trimethyl - 1 - cyclohexen-1-yl)-4,8,13,17-tetramethyl-2,4,6,8,10,12,14,16,18-nonadecanonaen-1-ol thus obtained showed U.V. absorption maxima at 443 and 471 mµ in petroleum ether.

The alcohol obtained as described above was dissolved in 10 ml. of absolute ether and 5 ml. of absolute benzene, 2 ml. of pyridine were added and then a solution of 1 ml. of acetyl chloride in 5 ml. of absolute ether was dropped in at 0°. After 5 hours, the product was worked up as described in Example 3. The product, 19-(2,6,6-trimethyl - 1 - cyclohexen-1-yl)-4,8,13,17-tetramethyl-1-acetoxy-2,4,6,8,10,12,14,16,18-nonadecanonaene, crystallized from petroleum ether (boiling range 60–90°) in the form of orange needles, M.P. 122–124°, U.V. absorption maxima at 444 and 473 mµ in petroleum ether ($E_1^1$=2620, 2390).

Example 6

144 g. of 19-(2,6,6-trimethyl-1-cyclohexen-1-yl)-4,8,13,17 - tetramethyl - 2,4,6,8,12,14,16,18-nonadecaoctaen-10-yn-1-al were suspended in 65 ml. of orthoformic acid ethyl ester and, after the addition of a solution of 1.4 ml. of phosphoric acid and 0.1 g. of p-toluenesulfonic acid in 25 ml. of absolute ethanol, the suspension was heated at 40° in a nitrogen atmosphere while stirring. After 4 hours, 80 ml. of absolute benzene were added and after 20 hours an additional 100 ml. of absolute benzene were added. The mixture was stirred for an additional 24 hours at the same temperature. Then, while cooling with ice, 10 ml. of pyridine and 200 ml. of 5% sodium bicarbonate solution were added to the reaction mixture. The mixture was extracted with ether, the ether extract was washed with water, dried over potassium carbonate, evaporated in vacuo and then dried at 40° in a high vacuum. Yellow plates of 1,1-diethoxy-19-(2,6,6-trimethyl - 1 - cyclohexen-1-yl)-4,8,13,17-tetramethyl-2,4,6,8,12,14,16,18-nonadecaoctaen-10-yne were obtained and this material was used without further purification.

The crude product obtained above was dissolved in 300 ml. of methylene chloride. While stirring at 35°, 31 g. of propenyl ethyl ether and 22 cc. of a 10% solution of zinc chloride in ethyl acetate were dropped in simultaneously. Stirring was continued in a nitrogen atmosphere for 16 hours. To the crude 1,1,3-triethoxy-21-(2,6,6 - trimethyl-1-cyclohexen-1-yl)-2,6,10,15,19-pentamethyl-4,6,8,10,14,16,18,20-heneicosaoctaen-12-yne was added a solution of 75 g. of sodium acetate in 750 cc. of acetic acid. The mixture was heated while stirring in a current of nitrogen for 4 hours at 95°, whereupon benzene and ethyl acetate distilled off. After cooling, the mixture was taken up in methylene chloride, the methylene chloride extract was washed with 5% sodium bicarbonate solution and with water, dried over sodium sulfate and the solvent was distilled off in vacuo. The 21-(2,6,6-trimethyl-1-cyclohexen - 1 - yl)-2,6,10,15,19-pentamethyl-2,4,6,8,10,14,16,18,20-heneicosanonaen-12-yn-1-al thus obtained crystallized from high boiling petroleum ether in the form of red plates; M.P. 177 to 178°.

9.0 g. of 21-(2,6,6-trimethyl-1-cyclohexen-1-yl)2,6,10, 15,19 - pentamethyl - 2,4,6,8,10,14,16,18,20-heneicosanonaen-12-yn-1-al were dissolved in 300 cc. of toluene. 4 g. of lead deactivated palladium-calcium carbonate catalyst and 0.4 ml. of quinoline were added. The mixture was hydrogenated according to the procedure described in the fourth paragraph of Example 1 to obtain 21-(2,6,6-trimethyl - 1 - cyclohexen-1-yl)-2,6,10,15,19-pentamethyl-2,4,6,8,10,12,14,16,18,20 - heneicosadecaen - 1 - al, M.P. 146–147°.

2.15 g. of 21-(2,6,6-trimethyl-1-cyclohexen-1-yl)-2,6,10,15,19 - pentamethyl-2,4,6,8,10,12,14,16,18,20-heneicosadecaen-1-al were dissolved in 80 ml. of absolute ether and 60 ml. of absolute benzene. A solution of 55 mg. of lithium aluminum hydride in 10 ml. of absolute ether were then dropped in at 0° with stirring. After 1½ hours, the reaction mixture was worked up as described in Example 3 to obtain crude crystalline 21-(2,6,6-trimethyl - 1 - cyclohexen-1-yl)-2,6,10,15,19 - pentamethyl-2,4,6,8,10,12,14,16,18,20-heneicosadecaen-1-ol, U.V. absorption maxima at 436, 459 and 488 mµ in petroleum ether.

The product obtained above was dissolved in 50 ml. of absolute benzene, 5 ml. of pyridine were added to the solution and then 2.5 ml. of acetyl chloride in 15 ml. of absolute ether were dropped in. The reaction mixture was cooled on a water bath and permitted to react for 2 hours at room temperature, then worked up as in Example 3. The product, 21-(2,6,6-trimethyl-1-cyclohexen-1-yl) - 2,6,10,15,19-pentamethyl-1-acetoxy-2,4,6,8,10,12,14, 16,18,20-heneicosadecaene, was obtained in the form of red needles upon crystallization from ether, M.P. 136–137°, U.V. absorption maxima at 438, 461 and 490 mµ in petroleum ether ($E_1^1$=2000, 2600 and 2030).

Example 7

24 ml. of orthoformic acid ethyl ester and a solution of 0.2 ml. phosphoric acid and 0.05 g. of p-toluenesulfonic acid in 12 ml. of absolute ethanol were added to 59 g. of 21-(2,6,6-trimethyl-1-cyclohexen-1-yl) - 2,6,10,15,19-pentamethyl-2,4,6,8,10,14,16,18,20 - heneicosanonaen-12-yn-1-al and the mixture was stirred at 40° in a nitrogen atmosphere. After 3 hours, 30 ml. of absolute benzene were added, after 10 hours an additional 30 ml. and after 24 hours still an additional 40 ml. of benzene were added and the stirring was continued at 40° for an additional 24 hours. While cooling with ice, 2 ml. of pyridine and 50 ml. of 5% sodium bicarbonate solution were added. After extracting the reaction product with methylene chloride, the extract was washed with water, dried with potassium carbonate, evaporated in vacuo and dried at 40° under high vacuum. The 1,1-diethoxy-21-(2,6,6-trimethyl-1-cyclohexen-1-yl)-2,6,10,15,19 - pentamethyl-2,4,6,8,10,14,16,18,20-heneicosanonaen-12-yne thus obtained was used in the next step without further purification.

The crude product obtained above was dissolved in 90 ml. of methylene chloride. 10.0 g. of vinyl ethyl ether and 7.5 ml. of a 10% solution of zinc chloride in ethyl acetate were simultaneously added while stirring at 30°. After 15 hours, there was added to the 1,1,3-triethoxy-23-(2,6,6-trimethyl-1-cyclohexen-1-yl) - 4,8,12,17,21 - pentamethyl-4,6,8,10,12,16,18,20,22-tricosanonaen-14-yne thus obtained a solution of 35 g. of sodium acetate in 350 ml. of acetic acid and the mixture was heated in a current of nitrogen at 95° while stirring. The reaction mixture was cooled after 4 hours and extracted with methylene chloride. The methylene chloride extract was washed with a 5% sodium bicarbonate solution and with water, dried with sodium sulfate and the solvent was evaporated in vacuo to obtain crude 23-(2,6,6-trimethyl-1-cyclohexen-1-yl)-4,8,12,17,21 - pentamethyl - 2,4,6,8,10,12,16,18,20,22-tricosadecaen-14-yn-1-al. The crude aldehyde crystallized from benzene in the form of dark red plates, M.P. 170 to 171°.

The product obtained above was hydrogenated to 23-

(2,6,6-trimethyl - 1 - cyclohexen-1-yl)-4,8,12,17,21-pentamethyl - 2,4,6,8,10,12,14,16,18,20,22 - tricosaundecaen-1-al by the procedure described in the fourth paragraph of Example 1, M.P. 160-161°.

2.3 g. of 23-(2,6,6-trimethyl-1-cyclohexen-1-yl)-4,8,12,17,21-pentamethyl - 2,4,6,8,10,12,14,16,18,20,22 - tricosaundecaen-1-al were dissolved in 50 ml. of benzene and a solution of 50 mg. of lithium aluminum hydride in 9 ml. of absolute ether were dropped in. After one hour at room temperature, the reaction mixture was worked up as described in Example 3 and red, crystalline 23-(2,6,6-trimethyl-1-cyclohexen-1-yl) - 4,8,12,17,21 - pentamethyl-2,4,6,8,10,12,14,16,18,20,22-tricosaundecaen-1-ol was obtained, U.V. absorption maxima at 447, 473 and 503 m$\mu$ in petroleum ether.

The crystalline product obtained above was dissolved in 50 ml. of absolute benzene, 6 ml. of pyridine were added and a solution of 3 ml. of acetyl chloride in 10 ml. of absolute ether was dropped in while cooling with water. The mixture was permitted to react for 2 hours and then worked up as described in Example 3. The product, 23-(2,6,6-trimethyl-1-cyclohexen-1-yl) - 4,8,12,17,21-pentamethyl-1-acetoxy-2,4,6,8,10,12,14,16,18,20,22-tricosaundecaene, was obtained in the form of red needles by crystallization from ether, M.P. 145-147°, U.V. absorption maxima at 448, 474 and 504 m$\mu$ in petroleum ether ($E_1^1$=2010, 2905 and 2535).

*Example 8*

To 40 g. of 23-(2,6,6-trimethyl-1-cyclohexen-1-yl)-4,8,12,17,21-pentamethyl - 2,4,6,8,10,12,16,18,20,22-tricosadecaen-14-yn-1-al were added 16 ml. of orthoformic acid ethyl ester and a solution of 0.2 ml. of phosphoric acid and 0.05 g. of p-toluenesulfonic acid in 8 ml. of absolute ethanol. The mixture was stirred at 40° in a nitrogen atmosphere for 3 hours. 30 ml. of absolute benzene were then added and after an additional 20 hours 50 ml. more of benzene were added. After 48 hours 3 ml. of pyridine and then 50 ml. of a 5% sodium bicarbonate solution were added while cooling with ice. The reaction product was taken up in methylene chloride, the methylene chloride extract was washed with water and dried with potassium carbonate. The solvent was evaporated in vacuo and the residue was dried at 40° under high vacuum. 1,1-diethoxy - 23 - (2,6,6-trimethyl - 1 - cyclohexen-1-yl)-4,8,12,17,21 - pentamethyl - 2,4,6,8,10,12,16,18,20,22 - tricosadecaen-14-yne was obtained as a crystalline residue which was used in the next step without further purification.

The crude product obtained above was dissolved in 60 ml. of methylene chloride. While stirring at 35°, 7.5 g. of propenyl ethyl ether and 6 ml. of a 10% solution of zinc chloride in ethyl acetate were simultaneously

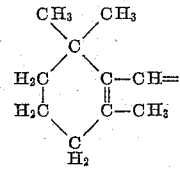

added. Stirring was continued for 16 hours in a nitrogen atmosphere. A solution 30 g. of sodium acetate in 300 ml. of 95% acetic acid was added to the resulting crude 1,1,3-triethoxy - 25 - (2,6,6-trimethyl-1-cyclohexen-1-yl)-2,6,10,14,19,23 - hexamethyl - 4,6,8,10,12,14,18,20,22,24-pentacosadecaen-16-yne and the mixture was heated at 95° under nitrogen whereupon methylene chloride and ethyl acetate distilled off. The reaction mixture was cooled to room temperature after 4 hours. The mixture was extracted with methylene chloride, the methylene chloride extract was washed with a 5% sodium bicarbonate solution and with water, dried with sodium sulfate and the solvent was evaporated in vacuo. The crude 25-(2,6,6-trimethyl-1-cyclohexen-1-yl) - 2,6,10,14,19,23 - hexamethyl-2,4,6,8,10,12,14,18,20,22,24 - pentacosaundecaen - 16 - yn-1-al thus obtained was recrystallized from benzene in the form of dark red leaflets, M.P. 178 to 180°.

The product obtained above was hydrogenated to 25-(2,6,6-trimethyl - 1 - cyclohexen-1-yl) - 2,6,10,14,19,23-hexamethyl-2,4,6,8,10,12,14,16,18,20,22,24 - pentacosadodecaen-1-al by the procedure described in the fourth paragraph of Example 1, M.P. 166-168°.

2 g. of 25-(2,6,6-trimethyl-1-cyclohexen-1-yl)-2,6,10,14,19,23 - hexamethyl - 2,4,6,8,10,12,14,16,18,20,22,24-pentacosadodecaen-1-al were dissolved in 80 ml. of absolute benzene. A solution of 45 mg. of lithium aluminum hydride in 8 ml. of absolute ether were dropped in with stirring at room temperature and permitted to react for 2 hours. The reaction mixture was then worked up as described in Example 3 to obtain crude red, crystalline 25 - (2,6,6 - trimethyl - 1 - cyclohexen - 1 - yl) - 2,6,10,14,19,23 - hexamethyl - 2,4,6,8,10,12,14,16,18,20,22,24-pentacosadodecaen-1-ol, U.V. absorption maxima at 462, 488, and 519 m$\mu$ in petroleum ether.

The crystalline material obtained above was dissolved in 80 ml. of benzene and 5 ml. of pyridine. A solution of 2.5 ml. of acetyl chloride in 10 ml. of absolute ether was added with stirring while cooling with water and the mixture was permitted to stand for 2 hours at room temperature. The product was worked up as described in Example 3. 25 - (2,6,6 - trimethyl - 1 - cyclohexen - 1-yl) - 2,6,10,14,19,23 - hexamethyl - 1 - acetoxy - 2,4,6,8,10,12,14,16,18,20,22,24-pentacosadodecaene was obtained in the form of red needles upon crystallization from ether, M.P. 152-154°, U.V. absorption maxima at 463, 488 and 519 m$\mu$ in petroleum ether ($E_1^1$=2170, 2460 and 1685).

We claim:

1. 19 - (2,6,6-trimethyl - 1 - cyclohexen - 1 - yl)-4,8,13,17 - tetramethyl - 2,4,6,8,10,12,14,16,18 - nonadecanonaen-1-ol.

2. 21 - (2,6,6 - trimethyl - 1 - cyclohexen - 1 - yl)-2,6,10,15,19 - pentamethyl - 2,4,6,8,10,12,14,16,18,20-heneicosadecaen-1-ol.

3. 23 - (2,6,6 - trimethyl - 1 - cyclohexen - 1 - yl)-4,8,12,17,21 - pentamethyl - 2,4,6,8,10,12,14,16,18,20,22-tricosaundecaen-1-ol.

4. 25 - (2,6,6 - trimethyl - 1 - cyclohexen - 1 - yl)-2,6,10,14,19,23 - hexamethyl - 2,4,6,8,10,12,14,16,18,20,22,24-pentacosadodecaen-1-ol.

5. A compound represented by the formula

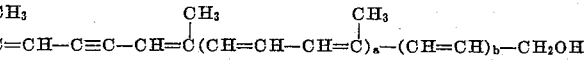

wherein *a* represents an integer from 0 to 3 and *b* represents an integer from 0 to 1.

6. 19 - (2,6,6 - trimethyl - 1 - cyclohexen - 1 - yl)-4,8,13,17 - tetramethyl - 2,4,6,8,12,14,16,18 - nonadecaoctaen-10-yn-1-ol.

7. A compound represented by the formula

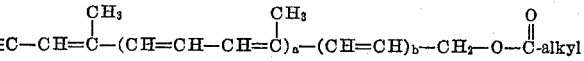

wherein *a* represents an integer from 0 to 3 and *b* represents an integer from 0 to 1.

8. 19 - (2,6,6 - trimethyl - 1 - cyclohexen - 1 - yl)-4,8,13,17 - tetramethyl - 1 - acetoxy - 2,4,6,8,12,14,16,18-nonadecaoctaen-10-yne.

References Cited in the file of this patent

UNITED STATES PATENTS

| | | |
|---|---|---|
| 2,451,739 | Isler | Oct. 19, 1948 |
| 2,576,103 | Cawley et al. | Nov. 27, 1951 |
| 2,676,992 | Humphlett | Apr. 27, 1954 |
| 2,913,487 | Grassetti et al. | Nov. 17, 1959 |

OTHER REFERENCES

Karrer et al.: Carotenoids, p. 144 (1950).

UNITED STATES PATENT OFFICE
CERTIFICATE OF CORRECTION

Patent No. 3,043,863                          July 10, 1962

Otto Isler et al.

It is hereby certified that error appears in the above numbered patent requiring correction and that the said Letters Patent should read as corrected below.

In the grant (only), line 1, for "Rudolf Rügg" read -- Rudolf Rüegg --; in the heading to the printed specification, line 9, for "Claims priority, application Switzerland Aug. 28, 1958" read -- Claims priority, application Great Britain Aug. 28, 1958 --.

Signed and sealed this 23rd day of April 1963.

(SEAL)
Attest:

ERNEST W. SWIDER
Attesting Officer

DAVID L. LADD
Commissioner of Patents